United States Patent [19]
Danowsky et al.

[11] Patent Number: 6,111,740
[45] Date of Patent: Aug. 29, 2000

[54] OVERVOLTAGE PROTECTION SYSTEM AND OVERVOLTAGE PROTECTION ELEMENT FOR AN OVERVOLTAGE PROTECTION SYSTEM

[75] Inventors: Volker Danowsky, Minden; Eberhard Lehmann; Klaus Scheibe, both of Kiel; Joachim Schimanski, Detmold; Joachim Wosgien, Löhne, all of Germany

[73] Assignee: Phoenix Contact GmbH & Co., Blomberg, Germany

[21] Appl. No.: 09/241,382

[22] Filed: Feb. 2, 1999

[51] Int. Cl.$^7$ ...................................................... H02H 1/00
[52] U.S. Cl. ........................ 361/120; 361/112; 361/129; 361/111; 361/91.1
[58] Field of Search ..................... 361/112, 120, 361/117–118, 123, 129, 130, 137, 111, 91.1, 56

[56] References Cited

U.S. PATENT DOCUMENTS

| | | | |
|---|---|---|---|
| 3,657,594 | 4/1972 | Latal | 315/36 |
| 4,631,453 | 12/1986 | DeSouza et al. | 315/340 |
| 4,683,514 | 7/1987 | Cook | 361/91 |

FOREIGN PATENT DOCUMENTS

| | | |
|---|---|---|
| 725 075 | 9/1942 | Germany. |
| 1 078 686 | 3/1960 | Germany. |
| 2 146 010 | 10/1972 | Germany. |
| 44 39 730 | 4/1996 | Germany. |

*Primary Examiner*—Michael J. Sherry
*Attorney, Agent, or Firm*—Nixon Peabody LLP; David S. Safran

[57] ABSTRACT

An overvoltage protection system with an overvoltage protection element (1) and an ignition aid which triggers the overvoltage protection element (1), the overvoltage protection element (1) having two main electrodes (2, 3) and an air-breakdown spark gap (4) which acts between the main electrodes (2, 3). An overvoltage protection system having a relatively small and also largely constant operating voltage is implemented by there being an ignition circuit (5) with an ignition voltage output (6) as the ignition aid, the overvoltage protection element (1) having an ignition spark gap (7) which acts between the main electrodes (2, 3) with at least one ignition electrode (8) and the ignition electrode (8) being connected to the ignition voltage output (6) of the ignition circuit (5).

15 Claims, 3 Drawing Sheets

OVERVOLTAGE PROTECTION SYSTEM AND OVERVOLTAGE PROTECTION ELEMENT FOR AN OVERVOLTAGE PROTECTION SYSTEM

BACKGROUND OF THE INVENTION

1. Field of the Invention

The invention relates to an overvoltage protection system with an overvoltage protection element and an ignition aid which triggers the overvoltage protection element, the overvoltage protection element having two main electrodes and an air-breakdown spark gap which acts between the main electrodes.

2. Description of Related Art

Electrical, but especially electronic measurement, control and switching circuits, mainly also telecommunications means and systems, are sensitive to transient overvoltage as can result especially from atmospheric discharges, but also from switching operations and short circuits in power supply grids. This sensitivity has increased to the extent that electronic components, especially transistors and thyristors, are used; mainly integrated circuits which are being increasingly used are greatly endangered by transient overvoltages.

To protect electrical, but especially electronic measurement, control and switching circuits, mainly also telecommunications means and systems, generally wherever electronic circuits are used, against transient overvoltages, overvoltage protection elements and overvoltage protection systems have been developed and have been known for more than twenty years (see, for example, published German patent applications or patents 27 18 188; 29 34 236; 31 01 354; 36 39 533; 37 16 997; 38 12 058; 38 37 051; 39 05 427; 39 10 435; 41 41 681; 41 41 682; 42 36 584; 42 44 051; 44 02 615; 44 35 968; and 44 39 730).

An important component of an overvoltage protection system is at least one overvoltage protection element which operates at a certain overvoltage (operating voltage), and thus, prevents overvoltages which are greater than the operating voltage of the overvoltage protection element from occurring in the area protected by this overvoltage protection element.

Overvoltage protection elements belonging to overvoltage protection systems in a wider sense are also gas-filled surge arresters, inductances, resistances and varistors (or components with similar nonlinear characteristics) which, as hybrid circuits, represent overvoltage protection systems (see, published German patent application 42 36 584). For overvoltage protection systems built in the form of hybrid circuits, there is also a rough protective element provided on the input side and a fine protective element provided on the output side (see, for example, published German patent application 39 05 427). If overvoltage protection systems are to differentiated as "coarse protective elements," on the one hand, and as "fine protective elements," on the other, then an overvoltage protection system of the type to which the present invention is directed is a coarse protective element.

It was mentioned at the start that an overvoltage protection element of the type to which the present invention is directed has two main electrodes, and an air-breakdown spark gap which acts between the main electrodes (see, published German patent applications or patent 37 16 997; 41 41 681; 41 41 682; 42 44 051; 44 02 615; 44 35 968; and 44 39 730). In addition to overvoltage protection elements with an air-breakdown spark gap, there are overvoltage protection elements with an air-flashover spark gap in which, therefore, a creeping discharge occurs when operated (see, published German patent applications 27 18 188; 29 34 236; and 31 01 354).

Overvoltage protection elements with an air-breakdown spark gap, as compared to overvoltage protection elements with an air-flashover spark gap, have the advantage of higher current carrying capacity, but the disadvantage of higher and not especially constant operating voltage. Consequently, various overvoltage protection elements with an air-breakdown spark gap have been developed which have been improved with reference to the operating voltage (see, published German patent applications 41 41 681; 41 41 682; 42 44 051; 44 02 615; 44 35 968; and 44 39 730.) Here, in the area of the primary electrodes or the air-breakdown spark gap which acts between the main electrodes, ignition aids have been produced in various ways, for example, such that at least one ignition aid which triggers a creeping discharge and which projects partially into the air-breakdown spark gap is located between the main electrodes, the ignition aids being made in the manner of a bar of plastic documents (see, published German patent applications 41 41 681, 41 41 682, 42 36 584, and 44 02 615) and the main electrodes can be provided with holes which allow, at the instant of operation of the overvoltage protection elements, i.e., at ignition, the resulting arc to be "activated" next to the holes by a thermal or electrical and/or magnetic pressure and force, so that it wanders away from its origin (see, published German patent application 44 02 615). The ignition aids which were addressed above and which are provided in the known overvoltage protection elements can be called "passive ignition aids," "passive" because they do not themselves respond actively, but respond only due to an overvoltage which occurs on the main electrodes.

SUMMARY OF THE INVENTION

The subject of the invention is not only an overvoltage protection system with an overvoltage protection element, it is rather also an overvoltage protection element as such which can be used in the initially described overvoltage protection system, but which can also be used in other overvoltage protection systems.

It has already been pointed out above that the overvoltage protection elements with an air-discharge spark gap have a relatively high, but not especially constant operating voltage. This of course also applies to overvoltage protection systems with one such overvoltage protection element. Consequently, the object of the invention is to devise an overvoltage protection system with an overvoltage protection element of the type under consideration or an overvoltage protection element which has a relatively low and largely constant operating voltage.

The overvoltage protection system in accordance with the invention in which the above described object is achieved is characterized, first of all and essentially, in that, as the ignition aid, there is an ignition circuit with an ignition voltage output, the overvoltage protection element has an ignition spark gap which acts between the main electrodes with at least one ignition electrode, and the ignition electrode is connected to the ignition voltage output of the ignition circuit. While, as noted above, in overvoltage protection systems or overvoltage protection elements known in the prior art there is only a "passive ignition aid," in accordance with the invention, at this point, an "active ignition aid" is achieved, "active" because, in addition to the air-breakdown spark gap, there is an ignition spark gap which is "actively" ignited, specifically, operating depending on the ignition voltage formed at the ignition voltage output of the ignition circuit.

In particular, there are several possibilities for embodying and developing the ignition circuit provided in the overvoltage protection system of the invention, and they are explained below in conjunction with the embodiments.

For the overvoltage protection element which belongs to the overvoltage protection system of the invention it is, first of all, essential that it have two main electrodes and an air-breakdown spark gap which acts between the main electrodes, and that, following the teaching of the invention, between the main electrodes, therefore in the area of the air-breakdown spark gap, there is an ignition spark gap with at least one ignition electrode.

If there is only one ignition electrode in the overvoltage protection element which belongs to the overvoltage protection system in accordance with the invention, of course, the ignition spark gap which basically requires two ignition electrodes must be accomplished between the additional ignition electrode and one of the two main electrodes. In this overvoltage protection element with three electrodes, then, one electrode represents both a main electrode and also an ignition electrode; one electrode is then functionally assigned both to the air-discharge spark gap and also to the ignition spark gap.

The prior art also includes an overvoltage protection element which is especially advantageous in various respects, which is described in published German patent application 44 02 615 and its U.S. counterpart U.S. Pat. No. 5,604,400, from which then embodiments and developments of published German patent applications 44 35 968 (corresponding U.S. Pat. No. 5,754,385) and 44 39 730 can be taken. The disclosed content of published German patent applications 44 02 615; 44 35 968 and 44 39 730 and counterpart U.S. Pat. Nos. 5,604,400 and 5,754,385, is expressly incorporated herein to avoid repetition.

One especially preferred embodiment of an overvoltage protection system as claimed in the invention or an overvoltage protection element which belongs to the overvoltage protection system as claimed in the invention is characterized, as is known from German patent disclosure document 44 02 615 and its U.S. counterpart U.S. Pat. No. 5,604,400, first of all, by the fact that each main electrode has a connecting leg and an arcing horn which runs at an acute angle to the connecting leg, the arcing horns of the two main electrodes being spaced from one another so as to form, together, the air-discharge spark gap.

As explained above, in the overvoltage protection element of the overvoltage protection system of the present invention, in addition to the two main electrodes, there must necessarily be at least one spark electrode. However, preferably, in the overvoltage protection element of the overvoltage protection system of this invention, there are two ignition electrodes so that the two main electrodes are assigned only to the air-breakdown spark gap, and the two ignition electrodes only to the ignition spark gap.

In the overvoltage protection system in accordance with the present invention, the ignition spark gap is part of the ignition aid to which the ignition circuit belongs as an "active functional part." Consequently, the ignition spark gap must be built with reference to the air-breakdown spark gap formed by the two main electrodes such that, once the ignition spark gap has operated, the air-breakdown spark gap operates. The operation of the ignition spark gap leads to ionization of the air present in the air-breakdown spark gap so that the air-breakdown spark gap operates suddenly after the ignition spark gap operates.

What was explained above as a functional necessity between the ignition spark gap and the air-breakdown spark gap can be accomplished in particular by the ignition spark gap, at least partially, preferably entirely, being formed within the air-breakdown spark gap, the ignition electrode or electrodes being located therefore between the main electrodes.

It has been noted above that there are in particular different possibilities for embodying and developing the ignition circuit for the overvoltage protection system in accordance with the present invention. With reference to the implementation of the ignition spark gap provided in the overvoltage protection system of the invention or the overvoltage protection element thereof, there are various possible embodiments and modifications.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
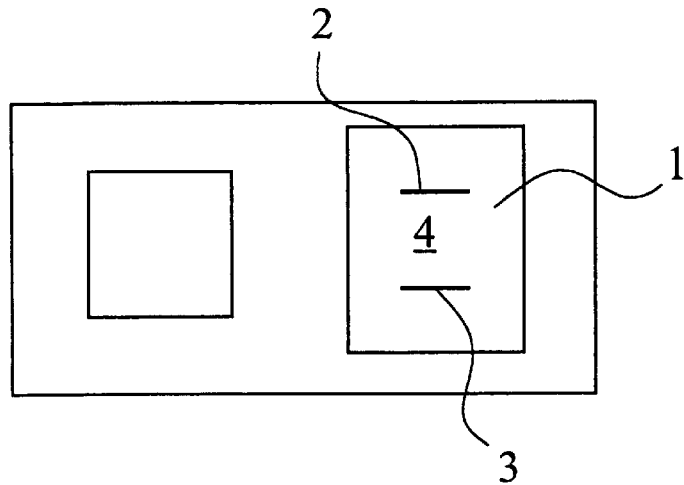
FIG. 1 is a schematic diagram of an overvoltage protection system in accordance with the present invention.

FIG. 1 shows only the basic structure of an overvoltage protection system in accordance with the present invention. This overvoltage protection system includes an overvoltage protection element 1 and an ignition aid. The overvoltage protection element 1 has two main electrodes 2, 3 and an air-discharge spark gap 4 which acts between the main electrodes 2, 3. The overvoltage protection element 1 can in particular be built as is shown, on the one hand, by published German patent applications 44 02 615, 44 35 968 (or their counterpart U.S. Pat. Nos. 5,604,400 and 5,754,385) and/or published German patent application 44 39 730, or can be as shown in the PHOENIX product summary 7 "TRABTECH Overvoltage protection" '98/99, imprint: TNR 5081956/0.0-30.9.790, pages 3, 6, 7, 8 and 12 to 17 which is available from the assignee of this application, Phoenix Contact GmbH and Co., Flachmarktstrasse 8–28, 32825 Blomberg, Germany, and all of which are hereby incorporated by reference to avoid the necessity of describing such known devices to which the present invention is applicable.

Figure 2:
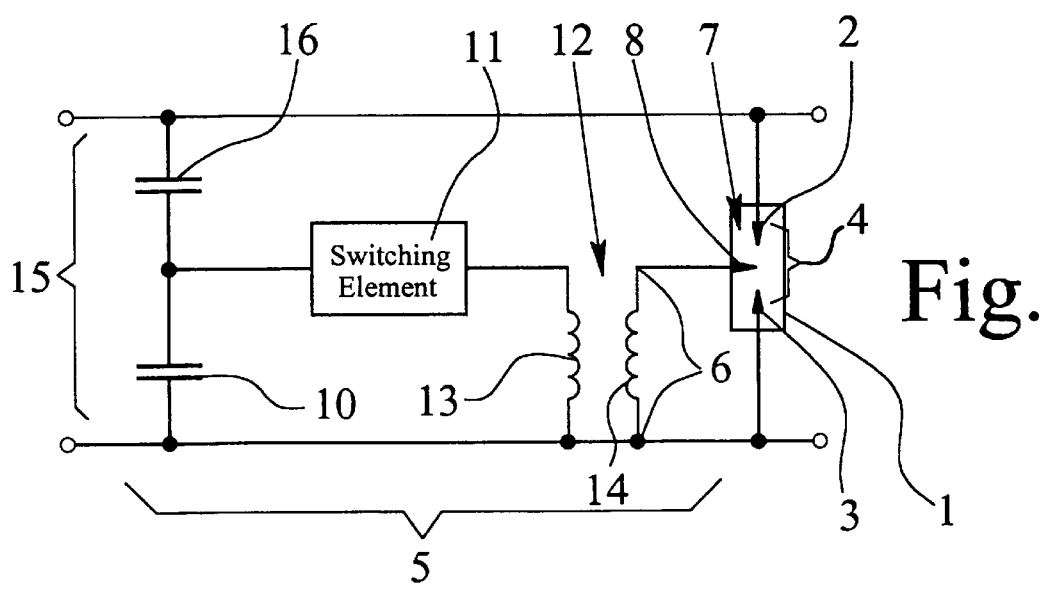
FIG. 2 is a circuit diagram of an overvoltage protection system in accordance with the present invention in which an overvoltage protection element is shown only schematically.

Turning now to the overvoltage protection system as shown in FIG. 2, as the ignition aid there, an ignition circuit 5 with an ignition voltage output 6 is provided. The overvoltage protection element 1 has an ignition spark gap 7 which acts between the main electrodes 2, 3 with at least one ignition electrode 8 that is connected to the ignition voltage output 6 of the ignition circuit 5. In particular, here, the ignition circuit 5 has an ignition capacitor 10, an ignition switching element 11 and an ignition transformer 12. The ignition transformer 12 has, as usual, a primary winding 13 and a secondary winding 14, the secondary winding 14 of the ignition transformer representing the ignition voltage output 6 of the ignition circuit 5. The ignition capacitor 10 of the ignition circuit 5 also is part of an input circuit 15 of the ignition circuit 5.

In the embodiment as shown in FIG. 2, the input circuit 15 comprises the ignition capacitor 10 and a series capacitor 16; the input circuit 15 formed of the ignition capacitor 10 and the series capacitor 16 is, therefore, a capacitive voltage divider. This also applies to the embodiment of an input circuit 15 shown in FIG. 3(a). The input circuit 15 of FIG. 3(a) differs from the input circuit 15 as shown in FIG. 2 simply in that the ignition capacitor 10 is adjustable.

Figure 3:
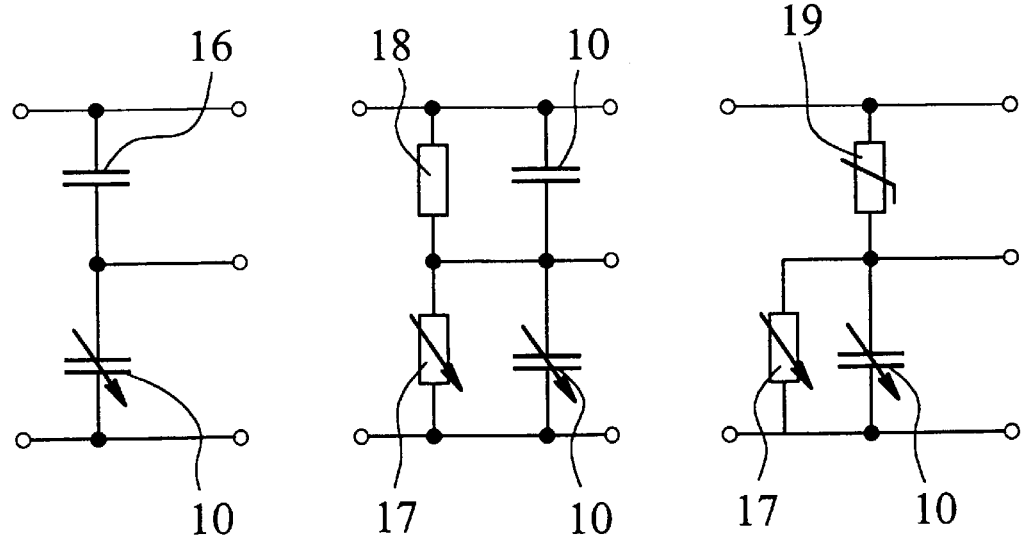
FIGS. 3(a), 3(b) and 3(c) each show a respective input portion of the ignition circuit belonging to the overvoltage protection system of the invention, these input portions being alternatives to the input portion of the circuit shown in FIG. 2.

While the embodiments of the input circuits 15 shown in FIGS. 2 and 3(a) for the ignition circuits 5 of the overvoltage protection system in accordance with the invention are capacitive voltage dividers, FIGS. 3(b) and 3(c) show embodiments of input circuits 15 which work as capacitive-ohmic voltage dividers. In the embodiment shown in FIG. 3(b), first of all, there is a series capacitor 16, as in the embodiment shown in FIG. 2. A parallel resistor 17, 18 is assigned, respectively to the ignition capacitor 10 and the series capacitor 16, the parallel resistor 17 assigned to the ignition capacitor 10 being adjustable. In the embodiment as shown in FIG. 3(c), as in the embodiment shown in FIG. 3(b), a parallel resistor 17 is assigned to the ignition capacitor 10. However, in this case a varistor 10 is connected in series to the parallel circuit of the ignition capacitor 10 and the parallel resistor 17 in the embodiment shown in FIG. 3(c).

How the ignition circuit 5 shown in FIG. 2 functions is easily understandable to one skilled in the art, and the same also applies to the modifications of FIGS. 3(a), 3(b) and 3(c).

When the voltage on the input circuit 15 of the ignition circuit 5 reaches a certain value, the ignition switching element 11, which can be, for example, a gas-filled switching spark gap, suddenly operates. The sequence thereof is that the ignition capacitor 10 suddenly discharges via the ignition switching element 11 which has become conductive and the primary winding 13 of the ignition transformer 12. The rapidly rising current pulse which forms in the primary winding 13 of the ignition transformer 12 induces a relatively high voltage in the secondary winding 14 of the ignition transformer 12 which leads to operation of the ignition spark gap 7. The operation of the ignition spark gap 7, which is formed at least partially, but preferably entirely within the air-breakdown spark gap 4 of the overvoltage protection element 1, leads to ionization of the air present in the air-breakdown spark gap so that, after operation of the ignition spark gap 7, then the air-breakdown spark gap 4 suddenly operates.

What has been explained above leads to the overvoltage protection system of the invention, or the overvoltage protection element 1 which belongs to the overvoltage protection system of the invention, having a relatively small, and also largely constant operating voltage. The teaching of the invention leads to the air-breakdown spark gap 4 belonging to the overvoltage protection element 1 not operating immediately due to an overvoltage. Rather, an overvoltage leads to operation of the ignition switching element 11 of the ignition circuit 5. This ignition switching element 11, for example, a gas-filled switching spark gap, has a relatively small and also largely constant operating voltage. Since, at this point, the operation of the ignition switching element 11 of the ignition circuit 5, for a relatively small and also largely constant operating voltage, triggers operation of the air-breakdown spark gap 4 of the overvoltage protection element 1, the air-breakdown spark gap 4 of the overvoltage protection element 1 operates at a relatively small and also largely constant operating voltage. Tests conducted in the meantime have shown that, in the overvoltage protection system in accordance with the invention, the air-breakdown spark gap 4 of the overvoltage protection element 1 operates at a voltage of roughly 600 V.

The embodiments of the input circuits 15 of the ignition circuit 5 shown in FIG. 2 and in FIGS. 3(a), 3(b) and 3(c) have various advantages. The embodiment shown in FIG. 2 is especially simple, but does not allow adjustment of the operating voltage. This adjustment is possible for the embodiments shown in FIG. 3(a), 3(b) and 3(c); in the embodiment shown in FIG. 3(a) by the adjustable ignition capacitor 10, in the embodiment shown in FIG. 3(b) by the adjustable parallel resistor 17, and in the embodiment shown in FIG. 3(c) by the adjustable ignition capacitor 10 and by the adjustable parallel resistor 17.

The embodiments of the input circuits 15 for the ignition circuit 5 shown in FIG. 2 and in FIGS. 3(a), 3(b) and 3(c) also differ with respect to the relationship between the operating voltage and the component tolerances. Since, in any case, relatively inexpensive, capacitors have component tolerances of up to 20%, the embodiments as shown in FIGS. 2 and 3(a) are less suitable when it is a matter of achieving not only relatively low operating voltage, but also being able to stipulate the effective operating voltage relatively accurately.

The embodiments as shown in FIGS. 3(b) and 3(c) are less sensitive with reference to component tolerances in the ignition capacitor 10 and series capacitor 16 or the ignition capacitor 10 because, in these embodiments, these component tolerances are qualified by the much lower component tolerances of the parallel resistors 17 and 18 or of the parallel resistor 17.

The adjustability provided in the embodiments as shown in FIGS. 3(a), 3(b) and 3(c) in the area of the input circuit 15 enables elimination of component tolerances on the factory side by the corresponding adjustments of the adjustable ignition capacitor 10 in the embodiment as shown in FIG. 3(a), the adjustable parallel resistor 17 in the embodiment shown in FIG. 3(b), and the adjustable ignition capacitor 10 and the adjustable parallel resistor 17 in the embodiment shown in FIG. 3(c).

The embodiment of an input circuit 15 for the ignition circuit 5 shown in FIG. 3(c), i.e., the embodiment in which the varistor 19 is in series with the parallel circuit of the ignition capacitor 10 and the parallel resistor 17 is especially advantageous. In this embodiment, component tolerances can be essentially ignored and a relatively high operating voltage is possible at a small level of protection.

In the embodiment shown in FIG. 3(c), the ignition capacitor 10 is adjustable and parallel to the adjustable ignition capacitor 10 there is an adjustable parallel resistor. This embodiment can also be simplified by using anonadjustable ignition capacitor 10 and eliminating the parallel resistor 17. This embodiment which is simplified as compared to the embodiment as shown in FIG. 3(c), then, has only a series connection of a nonadjustable ignition capacitor 10 and a varistor 19.

To date, the overvoltage protection system of the invention has been explained only in conjunction with an ignition electrode 8; in the embodiment shown in FIG. 2 only one ignition electrode 8 is illustrated. Preferably, in the overvoltage protection system of the invention, as shown in FIG. 4, the overvoltage protection element 1 has two ignition electrodes 8, 9 in addition to the two main electrodes 2 and 3.

Figure 4:
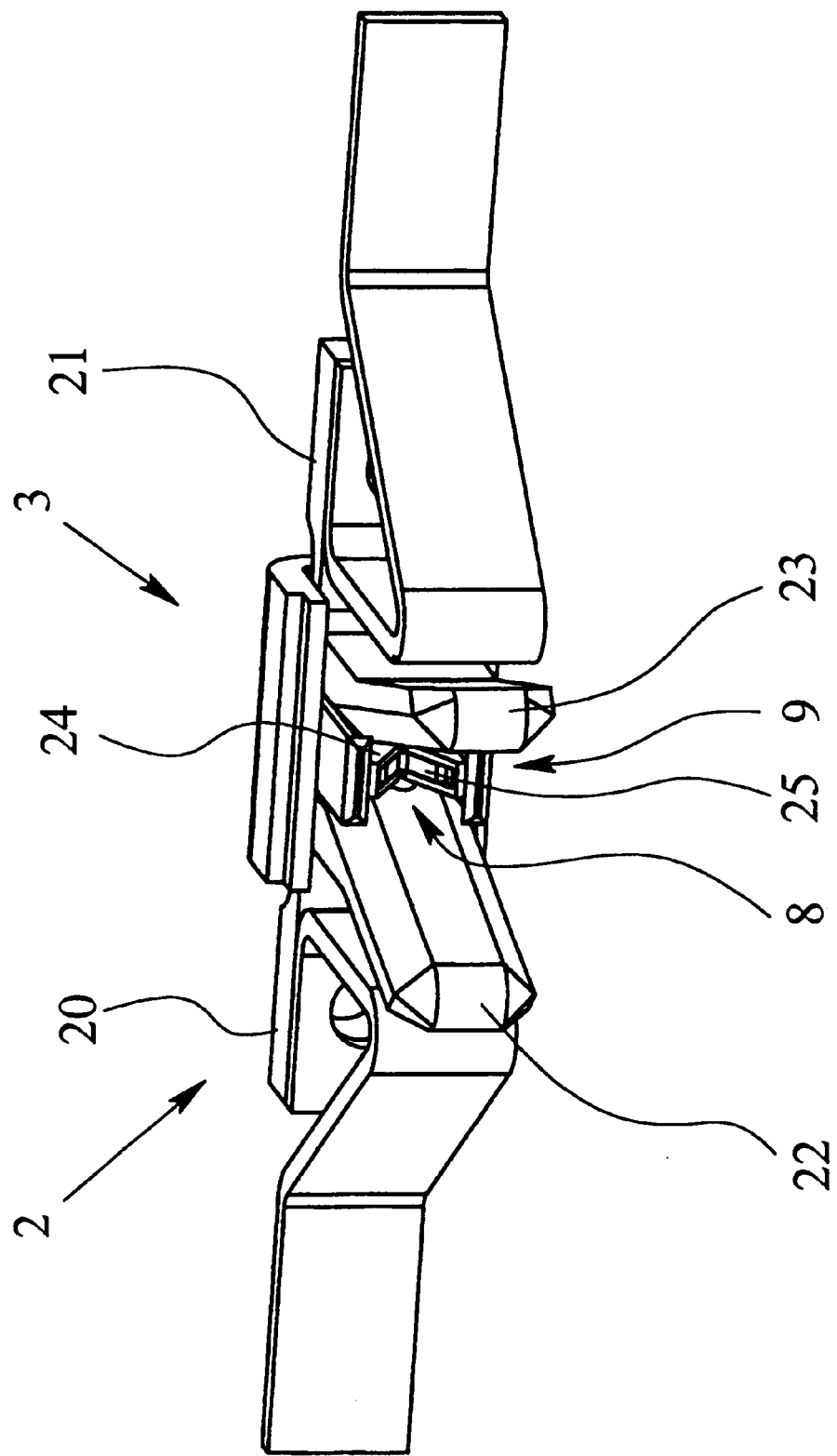
FIG. 4 is a perspective view of a preferred embodiment of the main electrodes and the ignition electrodes which belong to an overvoltage protection element of an overvoltage protection system in accordance with the invention.

The electrode system shown in FIG. 4 having two main electrodes 2, 3 and two ignition electrodes 8, 9, proceeds from the known overvoltage protection elements described in the documents incorporated by reference above. Here, each main electrode 2, 3 has a connecting leg 20, 21 and an arcing horn 22, 23 each of which runs at an acute angle to the respective connecting leg 20, 21, the arcing horns 22, 23 of the two main electrodes 2, 3 being spaced from one another forming the air-discharge spark gap 4 between them. In the embodiment shown in FIG. 4, the two ignition electrodes 8, 9 are built comparably to the main electrodes 2, 3; in the same manner in which arcing horns 22, 23 belong to the main electrodes 2, 3, the arcing horns 24, 25 belong to the ignition electrodes 8, 9. In particular, the arrangement of the ignition electrodes 8, 9 relative to the main electrodes 2, 3, as clearly shown in FIG. 4, is made such that the ignition electrode system formed of the ignition electrodes 8, 9 is offset by 90 degrees relative to the main electrode system formed of the main electrodes 2, 3.

Figure 5:
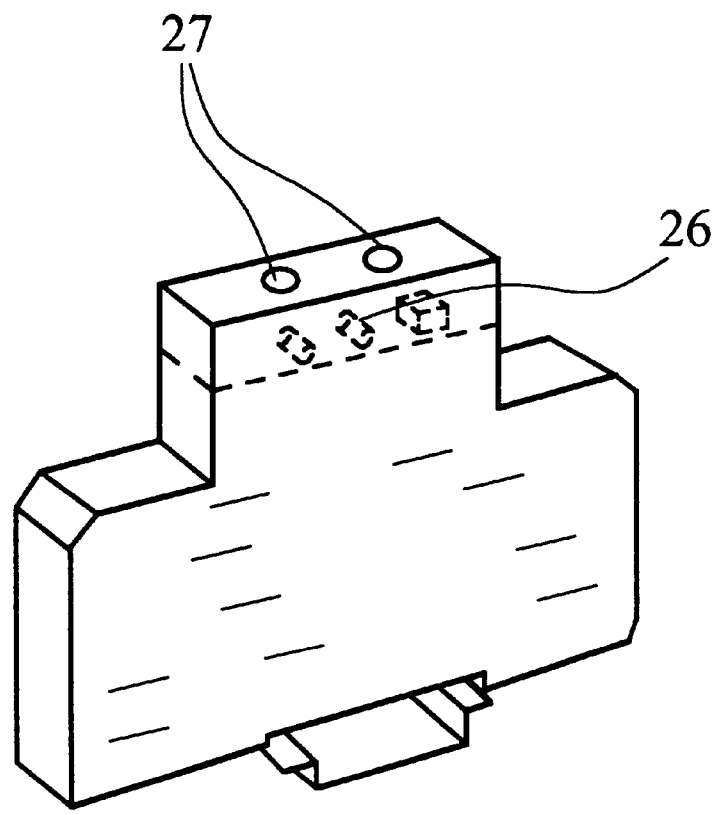
FIGS. 5(a) and 5(b) are schematic perspective views of two specific embodiments of the overvoltage protection systems in accordance with the present invention.
Figure 5:
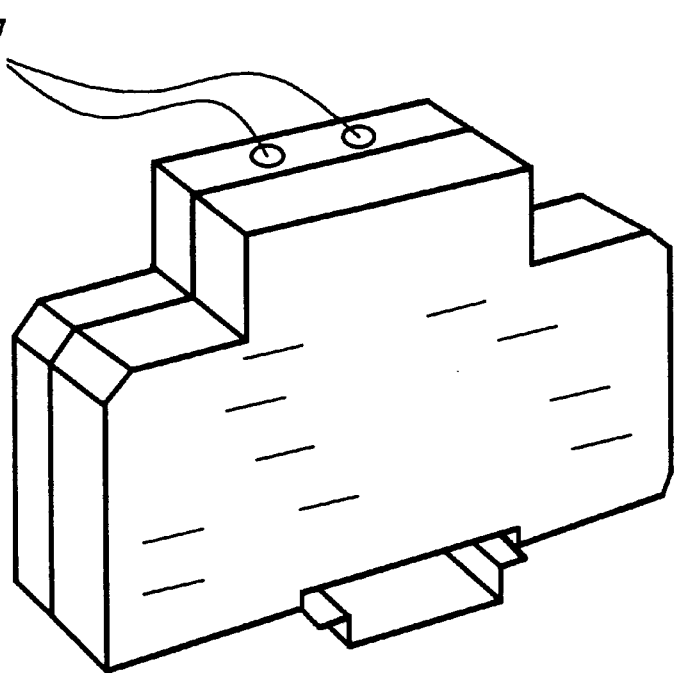

As follows from the aforementioned, the overvoltage protection system of the invention has an overvoltage protection element 1 which is known in and of itself, but is modified by the addition of the ignition electrodes 8, 9, and the ignition circuit 5. The ignition circuit 5 can be built entirely on a board 26 which can be accommodated either above or laterally to an overvoltage protection element 1 which is known in its outside dimensions. This is shown in FIG. 5(a) for the first alternative and in FIG. 5(b) for the second alternative. Both alternatives have their own advantages and disadvantages. In the first alternative, there is a greater structural height with the same structural width. In the second alternative, a uniform structural height is bought at the cost of a greater structural width.

In conjunction with the explanation of the different embodiments of the input circuit 15 of the ignition circuit 5 of the overvoltage protection system in accordance with the invention, reference has been made to the fact that, in the embodiments as shown in FIGS. 3(a), 3(b) and 3(c), there are adjustable components; an adjustable ignition capacitor 10 in the embodiment as shown in FIG. 3(a), an adjustable parallel resistor 17 in the embodiment shown in FIG. 3(b) and an adjustable ignition capacitor 10 and an adjustable parallel resistor 17 in the embodiment shown in FIG. 3(c). If these embodiments are to be achieved, provisions must, of course, be made for the adjustable components being adjustable from the outside. The housing which fully encompasses the overvoltage protection system of the invention must, therefore, have corresponding adjustment openings 27 which enable adjustment of the adjustable components using, e.g., a screwdriver. Preferably, there can also be a scale (not shown) so that the user of the overvoltage protection system of the invention can adjust the operating voltage using this scale as a guide.

What is claimed is:

1. Overvoltage protection system with an overvoltage protection element and an ignition aid for triggering the overvoltage protection element, the overvoltage protection element having two main electrodes and an air-breakdown spark gap between the main electrodes; wherein the ignition aid comprises an ignition circuit with an ignition voltage output, the overvoltage protection element has at least one ignition electrode in an ignition spark gap between the main electrodes, the ignition electrode being connected to the ignition voltage output of the ignition circuit; wherein the ignition circuit comprises an ignition capacitor an ignition switching element an ignition transformer and an input circuit comprising the ignition capacitor; and wherein the input circuit forms a voltage divider which produces a voltage drop at the ignition capacitor which is smaller than a voltage applied to the input circuit.

2. Overvoltage protection system as claimed in claim 1, wherein the input circuit further comprises a capacitor which is in series with the ignition capacitor.

3. Overvoltage protection system as claimed in claim 1, wherein the input circuit further comprises a capacitor which is in series with the ignition capacitor, a first resistor which is in parallel with the ignition capacitor and a second resistor which is in parallel with the series capacitor.

4. Overvoltage protection system as claimed in claim 3, wherein the first resistor is adjustable.

5. Overvoltage protection system as claimed in claim 4, wherein the ignition capacitor is adjustable.

6. Overvoltage protection system as claimed in claim 5, wherein the overvoltage protection element has two ignition electrodes between which the ignition spark gap is formed; and wherein the ignition spark gap formed by the two ignition electrodes is at least partially within the air-breakdown spark gap formed by two main electrodes.

7. Overvoltage protection system as claimed in claim 6, wherein the ignition spark gap for med by the two ignition electrodes is entirely within the air-breakdown spark gap formed by two main electrodes.

8. Overvoltage protection system as claimed in claim 6, wherein each main electrode has a connecting leg and an arcing horn which runs at an acute angle with respect to the connecting leg, the arcing horns of the two main electrodes located at a distance from one another and together form the air-discharge spark gap; and wherein the ignition electrodes have arcing horns which correspond to the arcing horns of the main electrodes.

9. Overvoltage protection systems as claimed in claim 8, wherein the pair of the ignition electrodes is offset by 90 degrees relative to the pair of main electrodes.

10. Overvoltage protection system as claimed in claim 1, wherein the input circuit further comprises a varistor which is in series with the ignition capacitor.

11. Overvoltage protection system as claimed in claim 1, wherein the input circuit further comprises a resistor connected in parallel with the ignition capacitor and a varistor which is in series with the parallel circuit of the ignition capacitor and the resistor.

12. Overvoltage protection system as claimed in claim 1, wherein the ignition capacitor is adjustable.

13. Overvoltage protection system as claimed in claim 1, wherein a gas-filled switching spark gap is provided as the ignition switching element.

14. Overvoltage protection system as claimed in claim 1, wherein the overvoltage protection element has two ignition electrodes between which the ignition spark gap is formed.

15. Overvoltage protection systems as claimed in claim 14, wherein the pair of the ignition electrodes is offset by 90 degrees relative to the pair of main electrodes.

* * * * *